United States Patent [19]

Irick et al.

[11] Patent Number: 4,949,012
[45] Date of Patent: Aug. 14, 1990

[54] AUTOMOTIVE VEHICLE DAYTIME RUNNING LIGHT CIRCUIT

[75] Inventors: W. T. Irick, New Haven; James L. Roussey, Fort Wayne; Merrill D. Miller, Huntington, all of Ind.

[73] Assignee: Navistar International Transportation Corp., Chicago, Ill.

[21] Appl. No.: 223,817

[22] Filed: Jul. 25, 1988

Related U.S. Application Data

[63] Continuation-in-part of Ser. No. 124,734, Jan. 21, 1988.

[51] Int. Cl.$^5$ ............................................... B60Q 1/04
[52] U.S. Cl. ........................................ 315/82; 315/83; 315/191
[58] Field of Search ...................... 315/80, 82, 78, 191; 307/10.8

[56] References Cited

U.S. PATENT DOCUMENTS

| | | | |
|---|---|---|---|
| 4,684,819 | 8/1987 | Haag et al. | 307/10 R |
| 4,713,584 | 12/1987 | Jean | 315/83 |
| 4,841,199 | 6/1989 | Irie | 307/10.8 |

Primary Examiner—Eugene R. LaRoche
Attorney, Agent, or Firm—F. David AuBuchon; Dennis K. Sullivan

[57] ABSTRACT

A daytime running light circuit is integrated with the existing headlight circuit of an automotive vehicle. The daytime running light circuit functions to automatically illuminate the headlights at reduced intensity when the vehicle is running and the headlight switch is turned off. Any time, however, that the headlight switch is turned on, the headlights are illuminated at full intensity. The daytime running light circuit comprises a day relay and a night relay. The night relay is responsive to the headlight switch being turned on for preventing operation of the daytime relay which would otherwise illuminate the headlamps at reduced intensity if the vehicle were running and the headlight switch off. When the headlight switch is off, the night relay enables the day relay to be operated whenever the vehicle is running. Indication that the vehicle is running is obtained from the alternator "R" terminal. The alternator "R" terminal signal may be further conditioned by sensing the status of one or more devices on the vehicle, such as the parking brakes or transmission, so that the day relay is operated by the alternator "R" terminal voltage signal only if all these one or more other devices indicate that the vehicle is not incapable of motion.

11 Claims, 3 Drawing Sheets

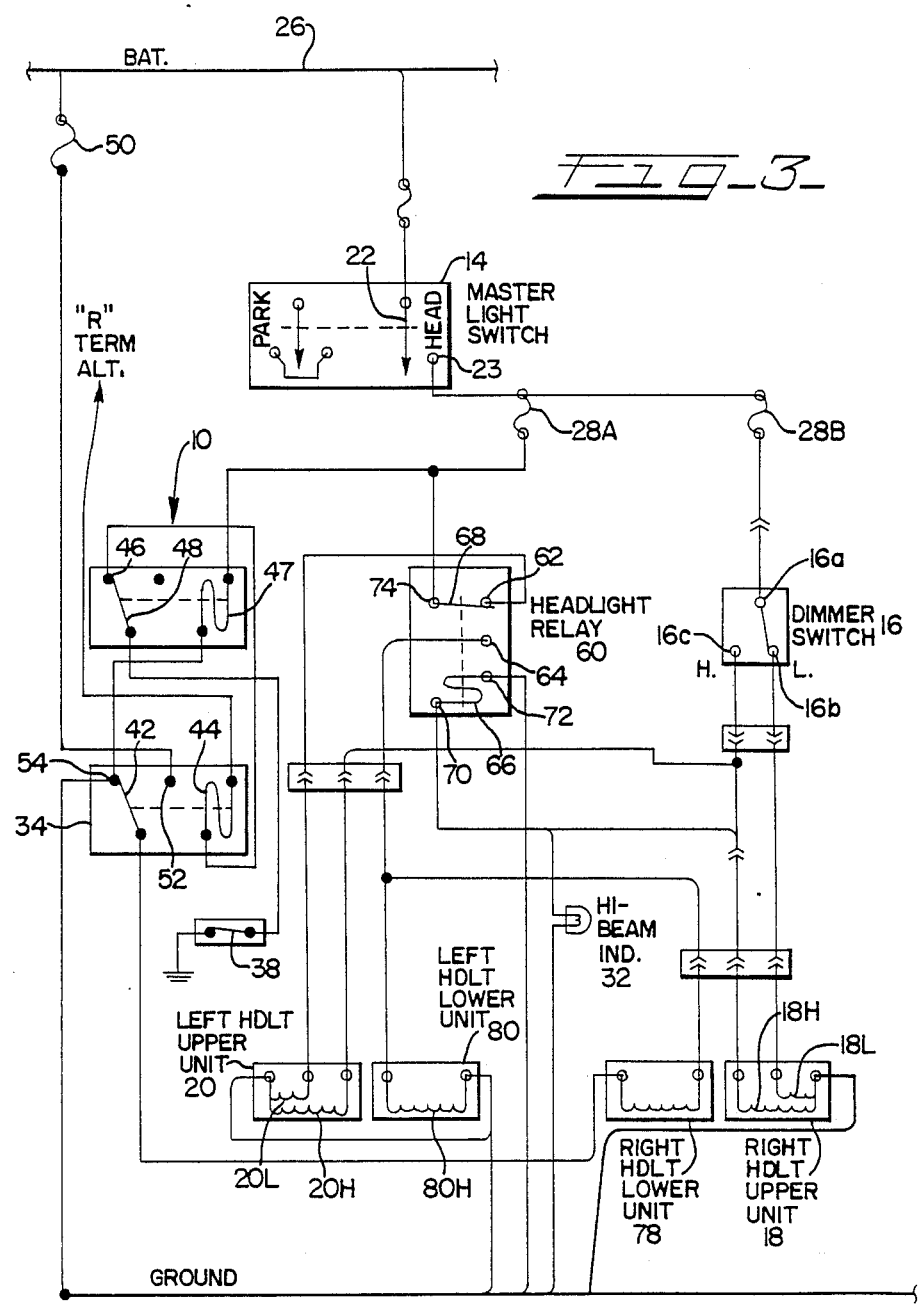

AUTOMOTIVE VEHICLE DAYTIME RUNNING LIGHT CIRCUIT

REFERENCE TO A RELATED APPLICATION

This application is a continuation-in-part of application Ser. No. 124,734 filed 1/21/88 in the names of Roussey and Miller.

BACKGROUND AND SUMMARY OF THE INVENTION

This invention relates generally to automotive vehicle electrical circuits. More specifically, it relates to electrical circuits that create daytime running lights by automatically illuminating the vehicle's headlights at reduced intensity when the vehicle is running and the headlight switch is off.

Running lights have been used on automotive vehicles for many years. Running lights on the exterior of the vehicle are connected in circuit with a switch on the interior of the vehicle that is under the control of the vehicle operator. In a truck or highway tractor, these lamps, which are sometimes called clearance, or marker, lamps, are illuminated whenever the operator turns the headlight switch on to illuminate the parking lights and/or the headlights. As such, these clearance, or marker, lamps are actuated to function principally as nighttime running lights because they are illuminated only at times when the parking lights or headlights are turned on. In the past, government regulations have established certain criteria for the operation and performance of such nighttime running lights.

Further extensions of government regulation mandate daytime running light systems on automotive vehicles. In general, these extensions of the regulations require the automatic illumination of daytime running lamps whenever the vehicle is running. Compliance can be accomplished either by placing additional lamps on the vehicle that are devoted exclusively to daytime running or by utilizing presently existing exterior lamps and making appropriate circuit modifications to assure proper daytime illumination intensity. For example, it is contemplated that operation of a vehicle's existing headlights at reduced voltage can provide suitable daytime running illumination intensity.

The incorporation of additional lamps which function exclusively as daytime running lights is probably the simplest to implement from an electrical circuit standpoint. However, other considerations make this approach undesirable, especially for vehicles which have already been designed. First, new lamps must be fabricated and mounted at suitable locations on the existing vehicle. This will undoubtedly require extensive design and re-tooling services. The additional lamps are also a significant added cost. Therefore, the utilization of a vehicle's existing lamps, such as the headlights, is preferable for incorporating the daytime running light feature.

Unfortunately, this more desirable approach tends to complicate the electrical circuitry that is used. This is because the integration of the daytime running light function must not interfere with other functions that are to be performed by the particular lamps chosen to perform daylight running. Thus, operation of the headlights at reduced illumination intensity to provide daytime running lights must not otherwise interfere with the ability of the headlights to be turned on at full intensity by the headlight switch, nor interfere with the high beam/low beam operation of the headlamps.

While the extended government regulations are addressed to newly manufactured vehicles, the possibility of retrofitting vehicles already in service is a consideration in the implementation of a daytime running light circuit. A circuit that can be compactly packaged and conveniently installed in existing vehicles is a desirable attribute.

Certain published regulations concerning daytime running lights are generally stated as requiring daytime running lights to be automatically turned on whenever the vehicle is running and the headlight switch is off. However, no specfic means are given for how these two conditions, i.e. vehicle running and headlight switch off, are to be sensed, nor how the desired running light function is to be performed in consequence of these two conditions.

U.S. Pat. Nos. 4,684,819 and 4,713,584 disclose two examples of daytime running lights circuits for automotive vehicles.

The present invention relates to a daytime running light circuit that is especially well suited for integration with existing exterior illumination systems of an automotive vehicle, and specifically in the disclosed embodiments, integration with existing headlight circuits of vehicles. Accordingly, the invention is readily compatible both as original equipment in new vehicles and for retrofit of many vehicles already in service. Moreover, the circuit of the present invention can be fabricated with a comparatively small number of conventional individual circuit devices. These devices can be conveniently packaged for expeditious installation in both new and older vehicles. The invention possesses novel and unique features which individually and collectively contribute to its attributes.

The circuit of the invention contemplates a unique means for sensing running of the vehicle. Contemporary automotive electrical systems comprise alternators, driven by the engine, that produce the electrical power for the electrical systems. The alternator output is operatively coupled by means of a regulator with the vehicle battery, or batteries, to maintain proper charge. A typical automotive alternator has a further terminal that is commonly referred to as the "R" terminal, and it is this "R" terminal that is used in the present invention to provide an indication that the vehicle is running.

When the alternator is being driven, a certain voltage is present at the "R" terminal. For a twelve-volt alternator, the "R" terminal output is six volts. But this voltage is present at the "R" terminal only after the engine has been started and is running. In other words, during the engine start cycle, no voltage is present at the "R" terminal, and it is only after the engine is running on its own and driving the alternator that voltage appears at the "R" terminal. The present invention advantageously utilizes this "R" terminal voltage as an indicator of vehicle running.

However, the fact that the engine is running is not necessarily conclusive that the vehicle is in motion. For example, the vehicle may be parked with the engine running, and in such a case, it may be deemed unnecessary to operate the daytime running lights. Accordingly, extended regulations have recognized that the daytime running lights need not necessarily come on until the vehicle transmission is placed in gear and/or an associated parking brake is released.

The circuit of the present invention utilizes the voltage at the alternator "R" terminal as an indication of running of the vehicle, and depending upon whether it is desired to illuminate the headlights while the engine is running and the vehicle parked, provision may be made for also interlocking the daytime running light circuit with associated transmission and/or parking brake switch(es).

Two disclosed embodiments of the daytime running light circuit comprise essentially two relays, a switch, and a resistor for integration with the existing headlight circuit of the vehicle; a third embodiment eliminates the resistor. Use of such a comparatively few number of components helps to keep down the cost of incorporating the daytime running light feature. The particular manner in which the circuit is organized and arranged with the existing headlight filaments serves to reduce the filament voltage to an appropriate level for meeting daytime illumination intensity requirements without the wastefulness that would be associated with use of additional voltage-reducing resistors or incorporation of a chopper circuit.

The foregoing features, advantages and benefits of the invention, along with additional ones, will be seen in the ensuing description and claims which should be considered in conjunction with the accompanying drawings. The drawings disclose a presently preferred embodiment in accordance with the best mode contemplated at the present time in carrying out the invention, and in the three drawing figures, like reference numerals are used to designate like parts.

BRIEF DESCRIPTION OF THE DRAWINGS

FIG. 3 is an electrical schematic diagram of a third circuit embodying principles of the invention.

DESCRIPTION OF THE PREFERRED EMBODIMENT

Figure 1:
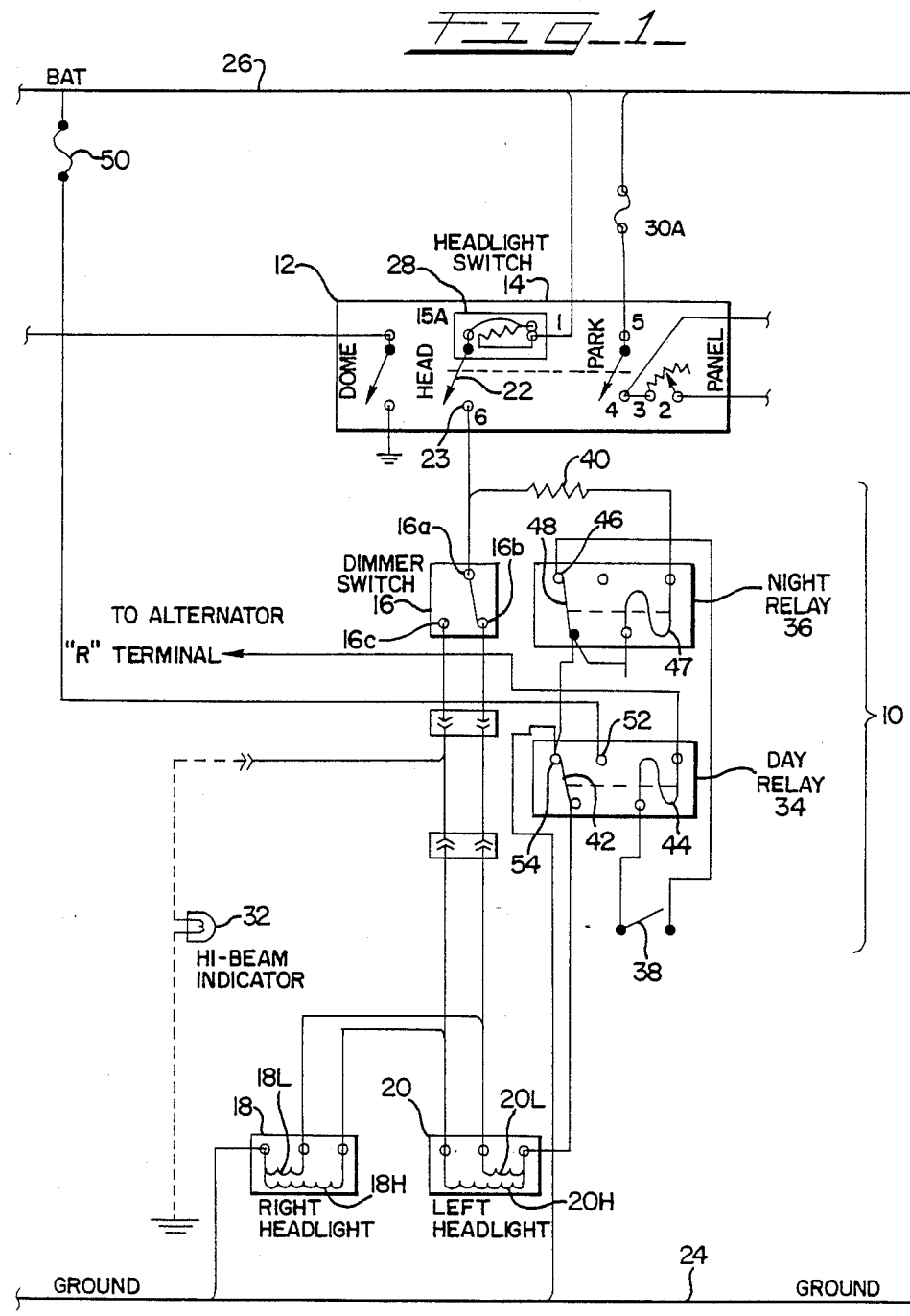
FIG. 1 is an electrical schematic diagram of a first circuit embodying principles of the invention.

FIG. 1 shows a daytime running light circuit, 10 generally, in association with an automotive vehicle headlight circuit, 12 generally.

Headlight circuit 12 comprises a conventional headlight switch 14, a dimmer switch 16, and right and left dual filament headlights 18 and 20 respectively.

Headlights 18 and 20 are powered from the vehicle's D.C. electrical power supply through a switch portion 22 of headlight switch 14. (Although the drawing figure portrays other switch portions of headlight switch 14, they do not relate to the present invention.) One of the D.C. power supply terminals is ground 24, and the ungrounded terminal of the power supply is identified by the reference 26.

The ungrounded terminal 26 connects through an internal circuit breaker 28 in headlight switch 14 to one side of switch portion 22. The output side 23 of switch portion 22 connects to the common terminal 16a of dimmer switch 16. Dimmer switch 16 is selectively operable to low beam and high beam positions respectively. The drawing figure shows dimmer switch 16 in the low beam setting with terminal 16a being connected to low beam terminal 16b. In this setting the low beam filaments 18L, 20L of headlights 18 and 20 are selected. In the high beam setting of dimmer switch 16, terminal 16a is connected to high beam terminal 16c causing the high beam filaments 18H, 20H to be selected.

It is typical to place a high beam indicator lamp on the vehicle instrument panel for illumination to indicate high beam filament operation. Accordingly, the circuit comprises such a high beam indicator lamp 32 connected between the high beam output terminal 16c of dimmer switch 16 and ground 24 so that whenever the high beam filaments are energized through dimmer switch 16, high beam indicator lamp 32 is too.

Both headlights 18 and 20 have a common terminal for their high and low beam filaments. The drawing figure shows the common terminal for right headlight 18 connected directly to ground 24. The common terminal of left headlight 20, however, is not continually connected to ground. Rather, it is connected through a portion of daytime running light circuit 10 in such a manner that its connection to ground is selectively controlled in accordance with whether or not circuit 10 is commanding the headlights to daytime running light operation.

Circuit 10 comprises a day relay 34, a night relay 36, a park switch 38, and a resistor 40. The condition portrayed by the schematic diagram is for headlight switch 14 off (i.e. switch portion 22 open) and for the daytime running lights not illuminated. In this condition the common terminal of headlight 20 is grounded through a movable contact 42 of day relay 34. Accordingly, the two headlights 18 and 20 form a parallel load which is connected directly across the power supply by closure of switch portion 22. In other words, the headlights can be turned on and off in the usual manner by turning switch portion 22 of headlight switch 14 on and off, the particular headlamp beam, either high beam or low beam, being selected by the setting of dimmer switch 16.

Daytime running light circuit 10 functions to illuminate headlights 18 and 20 at reduced intensity when the vehicle is running and switch portion 22 of headlight switch 14 is open.

One of the features of circuit 10 relates to the manner in which vehicle running is sensed. According to this aspect of the invention, the alternator "R" terminal is used to provide the principal indication that the vehicle is running. In the case of a twelve-volt alternator, its "R" terminal will develop a six-volt output signal, but only after the engine has been started and is running under its own power. While the appearance of such a voltage at the alternator "R" terminal may be directly used as the exclusive indicator that the vehicle is running, the mere fact that the engine has been started and is running does not necessarily mean that the vehicle is, in fact, capable of motion. Accordingly, while this aspect of the invention contemplates that the alternator "R" terminal voltage be used as the primary indication that the vehicle is running, such signal may be conditioned by one or more indicators of motion, such as release of an associated parking brake and/or placement of the transmission in a drive gear. In the illustrated embodiment, switch 38 is a park switch that serves to condition the "R" terminal voltage such that the "R" terminal voltage will not be effective on circuit 10 until such time as the vehicle is placed in a drive gear causing switch 38 to close. In other words, switch 38 is open when the vehicle transmission is not in a drive gear.

Day relay 34 comprises a six-volt coil 44 which controls movable contact 42. One side of coil 44 is connected to the alternator "R" terminal. The other side of coil 44 connects through switch 38 to a terminal 46 of night relay 36.

Night relay 36 comprises a twelve-volt coil 47 and a movable contact 48. One side of coil 47 connects through resistor 40 to switch portion 22 of headlight switch 14. The other side of coil 47 connects to ground 24. With this arrangement, coil 47 is de-energized whenever switch portion 22 is open but it is energized whenever switch portion 22 is closed. As such, night relay 36 in effect senses whether the headlight switch is operating the headlights on or off.

With the headlight switch off and coil 47 de-energized, terminal 46 connects through movable contact 48 to ground. This causes ground to be applied through switch 38 to one side of coil 44 of day relay 34. Hence, when the engine has been started and is running to produce "R" terminal voltage, and the transmission is placed in gear to close switch 38, coil 44 becomes energized. The energization of coil 44 operates movable contact 42 so that the ground which had previously existed at the common terminal of left headlight 20 is replaced by voltage from the ungrounded power supply terminal 26 that is supplied through a suitable fuse 50 to a terminal 52 of day relay 44 with which movable contact 42 is made once coil 44 is energized.

The two headlights 18 and 20 now become a series load across the power supply with energizing current for the headlight filaments flowing through fuse 50, contact 42, and through the now series connected headlamp filaments to ground 24. In a twelve-volt system this results in approximately six volts being applied across each headlight with the consequent illumination of each headlight at an intensity that is appreciably reduced from the full intensity which it would otherwise exhibit if energized by a full twelve volts. Accordingly, automatic daytime running light illumination of the headlights is accomplished and will continue until such time as either the vehicle is parked to open switch 38, the engine is shut off to remove the "R" terminal voltage from relay coil 44, or the headlight switch is turned on to command full illumination of the headlights.

When the headlight switch is operated to illuminate the headlights at full intensity, closure of switch portion 22 serves to energize coil 47 of night relay 36. In consequence, contact 48 is operated to remove the ground from switch 38 causing coil 44 of day relay 34 to immediately de-energize. Accordingly, contact 42 returns to engage terminal 54 to cause ground 24 to be applied to the common terminal of left headlight 20. The ultimate result is that both headlights 18 and 20 now are returned to a circuit condition where they form parallel loads on headlight switch 22 so that each illuminates at full intensity.

Thus, daytime running light circuit 10 provides for the automatic daytime illumination of the headlights at reduced intensity for daytime visibility purposes without interfering with the regular headlight circuit operation that operates the headlights at full intensity whenever the headlight switch is turned on to close switch portion 22.

Based upon the foregoing description, it can be appreciated that the invention can be embodied with relatively few components and it is adaptable for installation both as original equipment in a new vehicle and for retrofit purposes in vehicles already in service. The purpose of using resistor 40 (a 22 ohm, ½ watt device), is to prevent the night relay coil from being energized as the daytime running lights are first being turned on. Due to different characteristics between the respective right and left headlight filaments during initial warmup, the possibility that a voltage could be fed back through the dimmer switch to accidentally energize night relay coil 47 is precluded by the presence of resistor 40. However, the resistor does not interfere with the intended energization of coil 47 when the headlights are turned on from switch 14.

In addition to the aforementioned advantages, the illustrated daytime running light circuit possesses a functional advantage in relation to the headlight circuit. One of the headlights, the right headlight in this case, is always connected between ground and dimmer switch 16. Therefore, at least it can be illuminated at full intensity by turning the headlight switch on.

Figure 2:
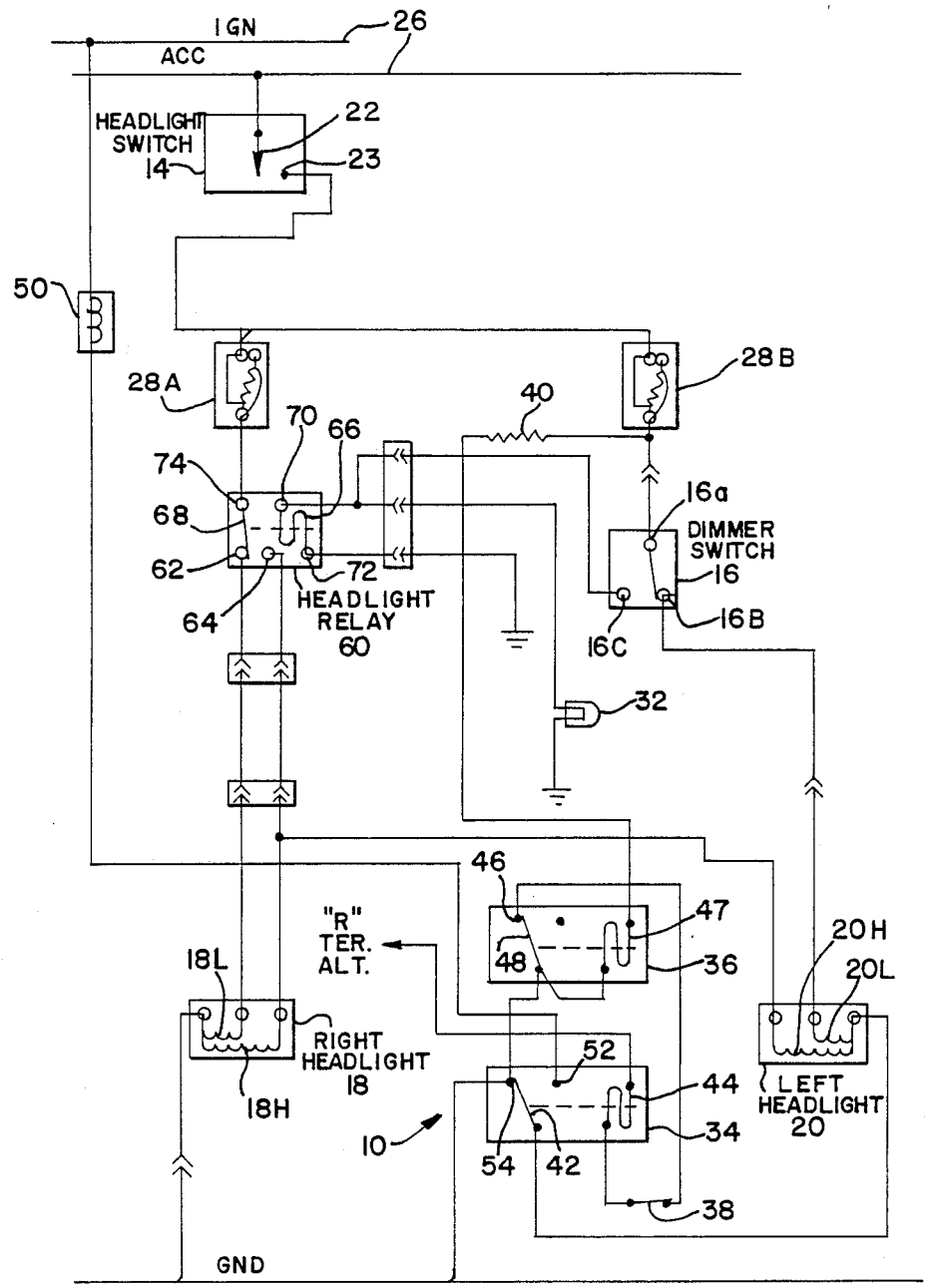
FIG. 2 is an electrical schematic diagram of a second circuit embodying principles of the invention.

FIG. 2 illustrates a second embodiment which is like the embodiment of FIG. 1 except that the right and left low beam filaments 18L, 20L, are split into two separate branch circuits from headlight switch 14. The branch for the left low beam filament 20L comprises a circuit breaker 28B and dimmer switch 16; the branch for right low beam filament 18L comprises a circuit breaker 28A and a headlight relay 60. As in the embodiment of FIG. 1, both headlights 18 and 20 have a common terminal for their high and low beam filaments. FIG. 2 shows the common terminal for right headlight 18 connected directly to ground 24. The common terminal of left headlight 20 is connected to movable contact 42 of day relay 34. The ungrounded terminal of right low beam 18L is connected to a terminal 62 of headlight relay 60 while the ungrounded terminal of the right high beam 18H is connected to another terminal 64 of relay 60. The terminal of the left high beam 20H that is not connected to movable contact 42 is connected to terminal 64 while the terminal of the left low beam 20L that is not connected to movable contact 42 is connected to terminal 16b of dimmer switch 16.

Relay 60 comprises a coil 66 that controls a movable contact 68. Coil 66 is connected between terminals 70 and 72 of the relay. Terminal 72 is connected to ground while terminal 70 is connected to terminal 16c of dimmer switch 16. When coil 66 is not energized, movable contact 68 is making a circuit between a further terminal 74 of relay 60 and terminal 62; when coil 66 is energized, movable contact 68 is operated to break the circuit to terminal 62 and make the circuit from terminal 74 to terminal 64. Terminal 74 is connected to the load side of circuit breaker 28A.

Therefore, with dimmer switch 16 and relay 60 in the condition shown in FIG. 2 (coil 66 not energized), both low beam filaments 18L and 20L will be energized from the vehicle power supply when headlight switch 22 is manually placed in the on condition in contact with the output terminal 23 of switch 14. Current the right for low beam filament 18L flows through headlight switch 14, through circuit breaker 28A and through movable contact 68; current for the left low beam filament 20L flows through headlight switch 14, through circuit breaker 28B and through dimmer switch 16. Thus the current flow for the two low beams is split into separate branches.

With headlight switch 14 on, operation of dimmer switch 16 to the high beam setting will extinguish the low beam filaments 18L, 20L and energize the high beam filaments 18H, 20H with the current for both high beam filaments flowing through circuit breaker 28A. More specifically, the operation of dimmer switch 16 to the high beam position causes coil 66 of relay 60 to be energized with the coil energizing current flowing through circuit breaker 28B and the dimmer switch. The energization of coil 66 operates movable contact 68 to connect terminal 64 to terminal 72 so that current flow to the high beam filaments is through headlight switch 14, through circuit breaker 28A and through movable contact 68. Thus it can be seen that the high beam filaments 18H, 20H are connected as a parallel load on the vehicle power supply so that both are operated substantially at their rated voltages to provide substantially full intensity rated illumination.

The manner is which daytime running light circuit 10 functions to illuminate the high beam filaments 18H, 20H is exactly the same as in the embodiment of FIG. 1. In other words, in the embodiment of FIG. 2, operation of the daytime running light circuit will be effective to connect the high beam filaments 18H, 20H in series with each other and across the vehicle power supply. Hence, when coil 44 of day relay 34 is energized, the connection of the common terminal of left headlight 20 to ground is broken and is instead connected to the ungrounded side 26 of the vehicle power supply through fuse 50 and the movable contact 42 of relay 34; consequently, current flows through fuse 50, through the movable contact 42, through the left high beam filament 20H and through the right high beam filament 18H to ground so that essentially one-half of the rated voltage is applied to each high beam filament 18H, 20H. As a result, the high beam filaments only are illuminated at a correspondingly reduced intensity to indicate daytime running operation.

FIG. 3 illustrates the daytime running light circuit 10 in association with a four headlight system which comprises right and left dual filament headlights 18 and 20 and right and left single filament high beam headlights 78 and 80. The dual filament headlights 18, 20, have the low beam filaments 18L, 20L respectively and the high beam filaments 18H, 20H respectively as in the preceding embodiments. The headlights 78, 80 have only single high beam filaments 78H, 80H respectively. The daytime running light circuit 10 is associated only with the single filament high beam headlights 78, 80.

The manner in which the daytime running light circuit 10 is associated with headlights 78 and 80 is analogous to the manner in which it was associated with the high beam filaments in FIG. 2. The low beam filaments 18L, 20L are split into separate branch circuits in the same manner as the circuit of FIG. 2. Hence in FIG. 3 low beam filament 18L is fed from dimmer switch 16 and low beam filament 20L is fed from movable contact 68 of relay 60 when the coil 66 of relay 60 is not energized. The manner in which the high beam filaments 18H and 20H are fed is different.

In FIG. 3 the high beam filaments 18H, 20H form a parallel load by both being connected to terminal 16c of dimmer switch 16. Hence, when the dimmer switch is operated to the high beam position, energizing current for the high beam filaments 18H, 20H flows through the headlight switch, through circuit breaker 28B and through dimmer switch 16. Dimmer switch 16 also serves to energize coil 66 of relay 60 when in the high beam position. The energization of coil 66 operates movable contact 68 to cause current to flow through headlight switch 14, through circuit breaker 28A and through movable contact 68 to the high beam filaments 78H, 80H which form a parallel load. Hence, when the headlights are on and the dimmer switch is operated to the high beam position, all four high beam filaments 18H, 20H, 78H, 80H are energized substantially with full rated voltage to thereby each illuminate at substantially full rated intensity.

When the headlight switch 14 is off and the vehicle is operating, the daytime running light circuit 10 becomes active. The energization of coil 44 of day relay 34 operates movable contact 52 to break the ground connection to one side of filament 78H and instead connect this side of filament 78H through fuse 50 to the ungrounded side 26 of the vehicle power supply. The two high beam filaments 78H, 80H are therefore now connected in series with each other and across the vehicle power supply so that each filament is energized at approximately one-half of its rated voltage. Accordingly each of the high beam filaments 78H, 80H operates at a reduced intensity to provide for daytime running light indication.

Although the two split systems that have been illustrated in FIGS. 2 and 3 utilize additional circuit components namely an additional circuit breaker and the headlight relay 60, these systems provide improved reliability in the event of an overload or a short circuit. Insofar as integration of the daylight running light circuit 10 is concerned, no additional components are required to implement it in either the FIG. 2 or the FIG. 3 embodiment save for the recognition that FIG. 3 is assumed to incorporate the four headlight system for improved nighttime illumination purposes. The FIG. 3 embodiment of the four headlight system has the further advantage in that only the single filament high beam headlights are utilized for daytime running illumination and this is accomplished without the need for blocking diodes or any additional relays. It is also to be noted that resistor 40 is unnecessary in the FIG. 3 embodiment.

The reader will appreciate that the vehicle electrical power supply comprises a battery (or batteries) that is (or are) charged via an alternator and voltage regulator. The foregoing description has referred to the power supply in general terms, and although different feed wires (labelled IGN and ACC) are shown in FIG. 2, they are called out by the same reference numeral 26 because both connect to the power supply through respective circuits (IGN and ACC) of the vehicle's ignition switch.

While a preferred embodiment of the invention has been illustrated and described, it will be appreciated that the principles of the invention are applicable to other embodiments.

What is claimed is:

1. In combination with an automotive vehicle headlight circuit which is powered from a source of electrical potential and comprises high and low beam headlights on both right and left sides of the vehicle, a headlight switch for turning the headlights on and off, and a dimmer switch that selects between the high and low beams of the headlights, and in which the low beams of the headlights are connected in separate branch circuits from the headlight switch, one of said branch circuits contains said dimmer switch, and the other of said branch circuits contains a switching means that is slaved to the dimmer switch, said dimmer switch and said switching means comprise respective switching devices each of which is operable to connect the low beam of the corresponding one of the right and left headlights across the source of electrical potential when the headlight switch is turned on and the dimmer switch is selecting the low beams, and to disconnect the low beam of the corresponding one of the right and left headlights from the source of electrical potential when either the headlight switch is turned off or the dimmer switch is selecting the high beams, said dimmer switch and said switching means further comprising means to connect the high beams of both the right and left headlights as a parallel load across the source of electrical potential when the headlight switch is turned on and the dimmer switch is selecting the high beams, and to disconnect the high beams of both headlights from the source of electrical potential when either the headlight switch is turned off or the dimmer switch is selecting the low beams, a daytime running light circuit comprising means providing a signal indicative of vehicle running, and means responsive to said signal and to said headlight switch being off for causing the high beams of both the right and left headlights to be connected in series with each other and across the source of electrical potential whereby each headlight will illuminate at appreciably less than its rated intensity when the vehicle is running and the headlight switch is off, to thereby provide daytime running light illumination while full intensity illumination by the high beams can be obtained at anytime by turning the headlight switch on and operating the dimmer switch to select the high beams.

2. The combination set forth in claim 1 in which said switching means is a relay comprising a coil that is energized when the dimmer switch is selecting one of said high and low beams and which is deenergized when the dimmer switch is selecting the other of the high and low beams, the switching device of said switching means comprising a movable contact which is operated by said relay coil and which, when the headlight switch is on and the dimmer switch is selecting low beams, connects the corresponding low beam to the source of electrical potential and which, when the headlight switch is on and the dimmer switch is selecting high beams, connects both high beams in parallel with each other and across the source of electrical potential.

3. The combination set forth in claim 1 in which said means providing a signal indicative of vehicle running comprises means responsive to the presence of energizing potential at the "R" terminal of an alternator that is driven by an engine that powers the automotive vehicle.

4. The combination set forth in claim 3 in which said means providing a signal indicative of vehicle running also includes conditioning means responsive to a device on the vehicle that is an indicator of the vehicle not being incapable of motion such that the presence of energizing potential at said "R" terminal causes each of the right and left high beams to operate at substantially one-half of its rated voltage when the headlight switch is off and said conditioning means indicates that the vehicle is not incapable of motion.

5. The combination set forth in claim 1 in which said means responsive to said signal and to said headlight switch being off for causing said right and left high beams to be connected in series with each other and across the source of electrical potential comprises a relay having a movable contact that is connected in circuit with one of said right and left high beams on a side thereof opposite the side to which the headlight switch is connected, said movable contact being operable to a condition that places both right and left high beams as a series load across the source of electrical potential when said signal is given and said headlight switch is off.

6. The combination set forth in claim 5 including a second relay having both a coil that is responsive to the headlight switch being on and a movable contact that is operated by said last-mentioned coil in response to the headlight switch being on for preventing operation of the coil of the first-mentioned relay and thereby preventing the movable contact of the first-mentioned relay from connecting the right and left high beams as a series load across the source of electrical potential.

7. The combination set forth in claim 6 in which a circuit element is connected between the coil of the second relay and the headlight switch for preventing feed-back voltage from the headlights from accidentally operating the coil of the second relay when the headlight switch is off and the coil of the first relay is operated.

8. The combination set forth in claim 1 in which the high and low beams on each of the right and left sides comprises a single dual filament headlight on the right and a single dual filament headlight on the left.

9. The combination set forth in claim 8 in which the high and low beams on the right and left side of the vehicle further include an additional single filament high beam headlight on each side, and in which said daytime running light circuit is associated with the additional single filament high beam headlights on both sides and not with the high beam filaments of the dual filament headlights.

10. In combination with an automotive vehicle headlight circuit which is powered from a source of electrical potential and which comprises dual filament high and low beam headlights on both right and left sides of the vehicle and single filament high beam headlights on both right and left sides of the vehicle, a headlight switch for turning the headlights on and off, and a dimmer switch that selects between the high and low beams of the headlights, the single filament high beam headlights are in a branch circuit from the headlight switch that is separate from the dual filament high beam headlights, a daytime running light circuit comprising means providing a signal indicative of vehicle running, and means responsive to said signal and to said headlight switch being off for operating only the single filament high beam headlights on both right and left sides of the vehicle to provide daytime running illumination.

11. The combination set forth in claim 10 in which the daytime running light circuit comprises means for operating each of the single filament high beam headlights at substantially one-half rated voltage to provide daytime running illumination.

* * * * *